Feb. 8, 1966     T. H. PROJECTOR ETAL     3,233,352
INFLATABLE LIGHTS AND SIGNS FOR AIRPORTS
Filed April 3, 1963     3 Sheets-Sheet 1
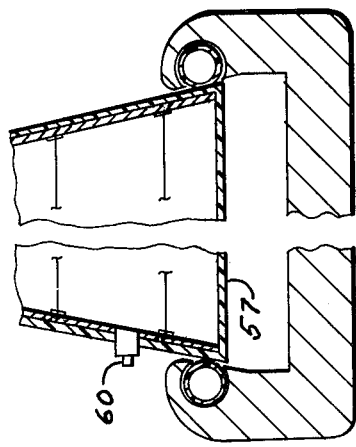
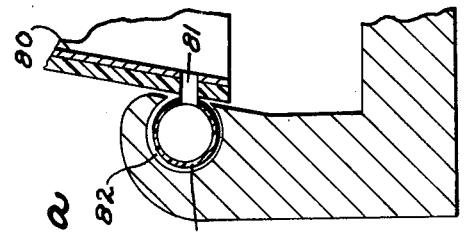
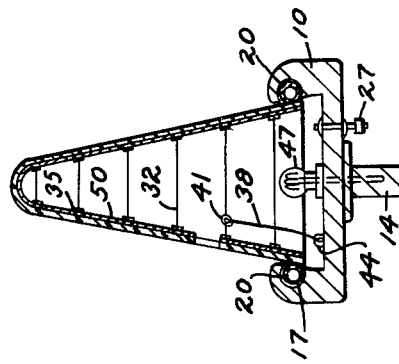
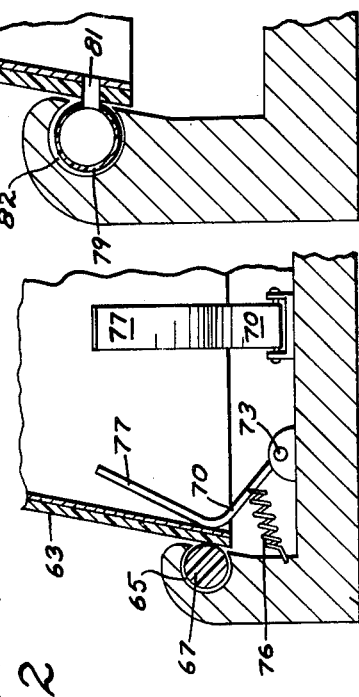
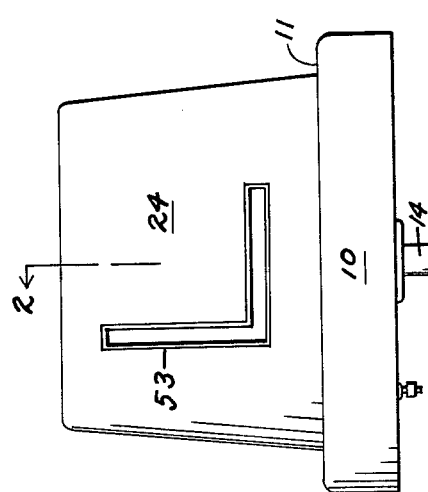
INVENTOR.
Theodore H. Projector
Robert S. Rinkinen
BY Albert M. Zalkind Feb. 8, 1966 T. H. PROJECTOR ETAL 3,233,352
INFLATABLE LIGHTS AND SIGNS FOR AIRPORTS
Filed April 3, 1963 3 Sheets-Sheet 2

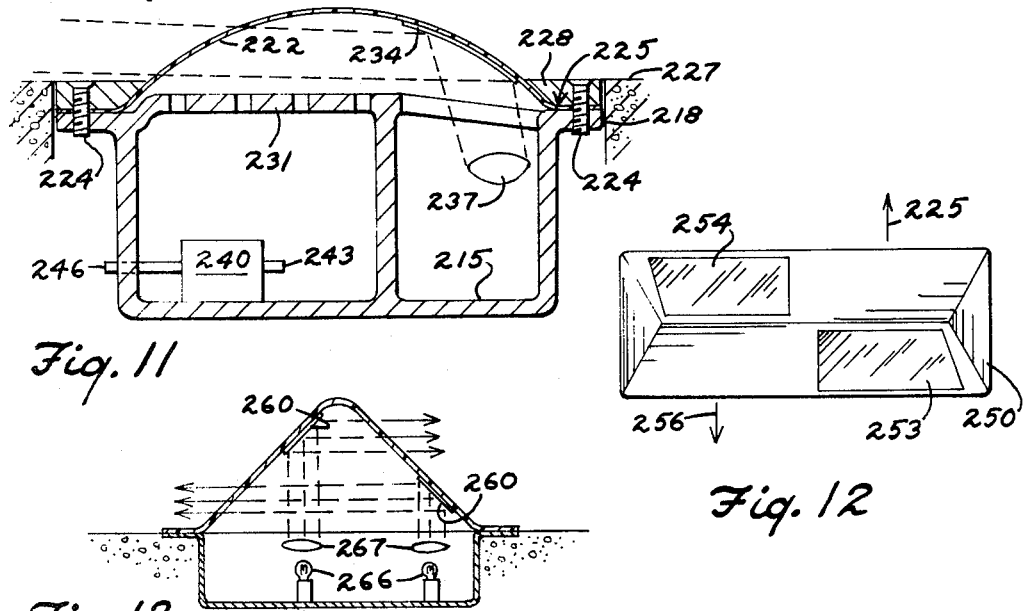
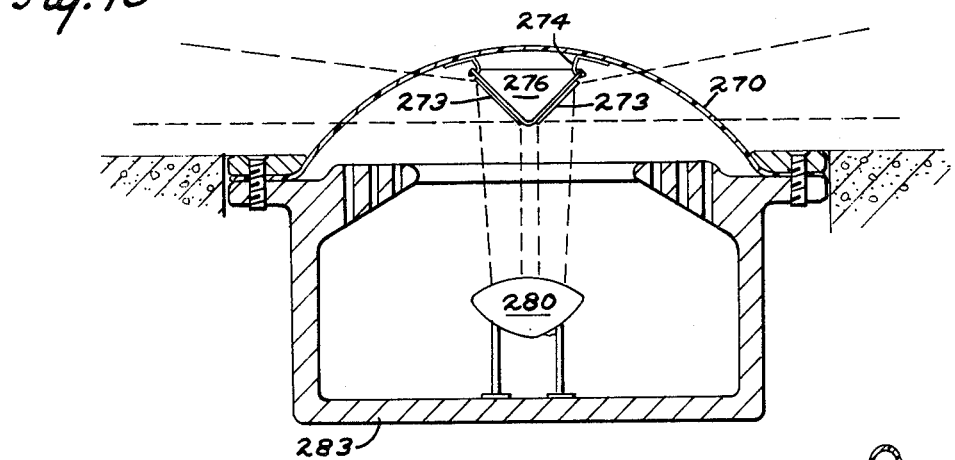
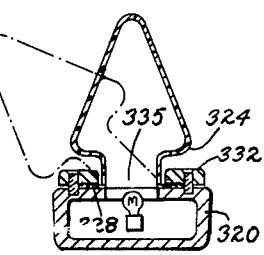
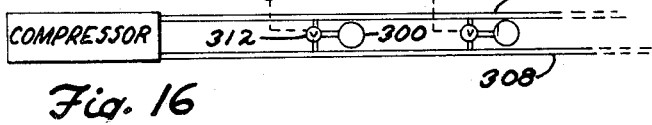

United States Patent Office 3,233,352
Patented Feb. 8, 1966

1

3,233,352
INFLATABLE LIGHTS AND SIGNS FOR AIRPORTS
Theodore H. Projector, 3304 Edgewood Road, Kensington, Md., and Robert S. Rinkinen, 4708 Topping Road, Rockville, Md.
Filed Apr. 3, 1963, Ser. No. 270,393
13 Claims. (Cl. 40—130)

This invention relates to airport signs and lights and more particularly to signs and lights of the type used for guiding aircraft on airport runways and taxiways.

The prior art in connection with airport signs usually contemplates fabrication of structural aluminum and rigid plastics. Such signs are placed adjacent to taxiways and are 20 to 30 inches above the ground. This is a dangerous condition due to possible collision of aircraft with the signs and, accordingly, such signs are usually mounted on pipe couplings designed to break on impact. However, even such designed frangibility is not completely effective inasmuch as a fairly high degree of strength of the support is required and thus damage to the aircraft and, of course, to the sign frequently results. The problem is made more serious by the increasing need for larger signs to improve visibility on modern airports.

There is also prior art contemplating the use of inflated signs for airports and, while such signs are less of a damage hazard when struck by aircraft, they have drawbacks, in that there is a certain amount of danger due to the maintenance of an inflated condition upon being struck, which offers continued resistance to impact. There is also the problem of maintaining proper inflation pressure. Thus, inflated signs of the prior art would need continual maintenance and surveillance to insure the inflated condition.

The prior art in connection with airport lights contemplates very strong construction with very low projection above ground, sometimes less than one inch. Unlike signs, lights are often placed in or on runways or taxiways where they may be struck by aircraft in normal operation. The lights must survive such collisions, remaining in operation, and the colliding aircraft must not be damaged or deviated in its course enough to risk possible loss of control by the pilot. Accordingly, lights are designed for minimum projection above ground and are shaped to promote smooth roll over by aircraft wheels. Their construction must be massive enough to withstand the heavy weight loads of the largest aircraft and the high impacts of rapidly moving or landing aircraft. Such lights also present very difficult maintenance problems. They usually have recesses which collect dust, dirt, snow, slush, water, etc., thus seriously reducing light efficiency. They are often severely damaged by snow removal equipment. In addition, with a small layer of snow or slush on the ground, the light emerges so close to the ground that at low angles of view, the light beams are seriously cut off.

Accordingly, the objects of the present invention are to overcome the drawbacks discussed above in prior art sign and light structures. Another object is to provide inflated signs and lights which can be readily and cheaply manufactured. A further object is to provide inflatable arrangements where maintenance of an inflated condition is automatic.

Other objects and features of the invention will be apparent from the description that follows:

Briefly, the invention provides for the combination of an inflatable bag or dome, preferably of plastic material, which is detachably secured to a ground fixed base. The bag or dome in certain forms of the invention is open at its bottom and is sealingly attached to the base so that the base forms the completing wall or bottom of an inflatable enclosure or chamber. In the case of the sign, when the plastic bag or dome is inflated, it is a clearly visible object, but, if struck by an aircraft, the detachable connection is released by the impact whereupon instant deflation occurs. Thus, there is a very rapid cessation of impact force due to the pulling of the bag away from the base. Such principle is applicable to signs which rise to any desired extent above ground. Such signs can be easily internally illuminated, in a manner to be disclosed herein.

Signs and lights may be equipped with an air pump or air bottle and pressure regulator so that the individual device is automatically maintained inflated at all times.

Alternatively, the signs or lights may be connected to a compressed air distribution system serving a group of similar equipment, or an entire airport. In the latter event, each unit is equipped with a pressure regulator.

The provision for impact breakaway is regarded as important for the signs, which rise appreciably above ground. In normal operation they are not subject to impact. Collisions between signs and aircraft occur only infrequently, as, for example, when a pilot loses control of his aircraft due to a mechanical failure, or due to some unusual operational condition. On such occasions, it is essential that the aircraft be protected, but the sign may be considered expendable. Lights, especially those located on runways or taxiways, on the other hand, may be struck by aircraft wheels in normal operation. In this case, the aircraft must not be seriously disturbed, not to mention damaged, and the light must remain operative. The lights must, therefore, be designed for aircraft roll over. In the inflated light, the inflated part, above ground is designed to be compressed flat to the surface during roll over. The part of the light which is below ground must be reinforced and furnished with ribs or grids in such a way that the aircraft wheel does not drop into a hole during roll over. Finally, the volume below ground must be sufficiently large that compression of the bag above ground does not produce an increase of pressure great enough to cause bursting.

A detailed description of the invention now follows in conjunction with the appended drawing, in which:

FIG. 1 is an elevation of a sign of the invention intended to be supported fully above the ground;

FIG. 2 is a section through 2—2 of FIG. 1 showing the open bottom bag with releasable detachment connection to the base:

FIG. 2a is an elevation in cross section of a modified arrangement wherein the bag is completely closed but has a detachable connection with the base;

FIG. 3 is a perspective showing the base and the groove of the detachable connection;

FIGS. 5 through 10 show, in fragmentary cross-sectional elevations, various mode of effecting break-away connections with open bottom bags;

FIG. 11 shows one form of ground light using an inflated dome with an automatically operating air pump and pressure regulator carried in the base;

FIG. 12 is a plan view of another form of ground light having bi-directional reflectivity; a cross section through either half would be similar to FIG. 11;

FIG. 13 shows a bi-directional light in which the two oppositely directed beams are at different heights above ground;

FIG. 14 is a cross section in elevation of another form of ground light which provides for bi-directional reflectivity;

FIG. 15 is a further form of ground light in which the openings at ground level are very small so that it can be rolled over by aircraft wheels with minimum disturbance of the aircraft;

FIG. 16 shows part of a compressed air distribution system for maintaining inflation pressure in signs and lights, and for deflating bags, as may be required occasionally in some installations; and FIG. 17 is a cross sectional elevation of a sign capable of bending upon impact or due to excessive wind stress.

Figure 6:
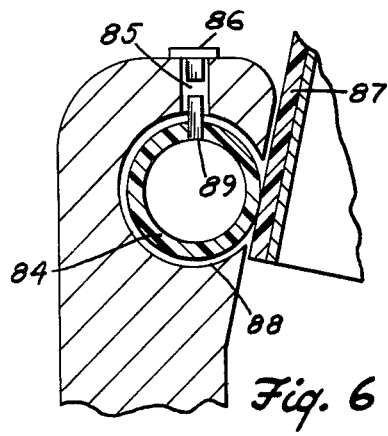

Referring now to FIGS. 1, 2 and 3, a form of the invention is shown comprising a base 10 preferably of cast aluminum, mounted on a short supporting post 14 which will be understood to be suitably fastened to the ground. Alternatively, the base 10 may be installed in the ground partially or wholly. In the latter case, the top 11, of the base 10, would be at ground level. The base is of generally rectangular shape with rounded ends and is provided with an inner peripheral groove 17 to take a resilient plastic bead or gasket 20 suitably and permanently secured to the lower margin of an inflatable plastic bag 24, which bag is shown as being open-bottomed. A suitable air inlet valve and coupling 27 are carried by the base in order to conduct air from a pump or other source (not shown) through the base and into the bag to effect an inflated condition. The inflation of the bag will put pressure on the bead in order to effect a tight seal to prevent air loss, but wherein such seal may be broken and the bag pulled away from the base, along with the bead in the event of forcible impact as by the wing tip of an aircraft. Such breakaway effects virtually instant deflation and collision resistance is then practically nil.

The bag may be provided with transverse tapes, cords or wires 32 suitably secured by cemented tabs 35 in order to ensure maintenance of the shape of the bag against air pressure. It is contemplated that only low air pressure is needed, no more than a few pounds per square inch. A safeguard against the bag being blown away after breakaway is provided by a rope or strap 38 or a plurality of ropes and straps which may be secured by means of a ring 41 to one of the transverse tension cords, the other end of such rope being fastened to the base at 44. Thus, in the event the bag is dislodged, it will not blow away nor can it be ingested into a jet intake of an aircraft.

A row of signs can be fed air from a common conduit instead of by individual inflation, connecting to the bases, with a valve and regulator at each base tapping to the conduit. In order to provide illumination, a suitable lamp is illustrated at 47, which may be caried by the base, and the interior of the bag provided with a highly reflective coating 50 by methods known in the plastic industry, such coating being omitted in designated areas so that the light can pass through the bag in predetermined shapes, for example, the letter L, as shown. Thus, the bag would normally be made of transparent of translucent material for such purpose. Any desirable coloring scheme can, of course, be utilized in accordance with airport code requirements; for example, the exterior of the bag could be painted a flat black with a yellow border 53 painted around the transparent or translucent area designating the number or letter delineated.

FIG. 2a contemplates substantially the same type of construction except for the use of a bag which has a closed bottom 57 and a valve 60. In such instance, the breakaway feature is preserved, although the rapid deflation is sacrificed; also, in this instance, the base is sunk in the ground.

FIG. 4 shows a modification of the breakaway design shown in FIG. 2. In this modification the force against dislodgment provided by the bead and groove design is supplemented by spring-actuated clamps. In the figure, the bag 68, bag 63, bead 67, and groove 65 are similar to these parts, as illustrated in FIG. 2. A clamp 70 pivoted to the base at 73 and biased by a spring 76 exerts pressure on the inside of the bag at the location of the bead, thus adding to the pressure exerted at that point by the compressed air in the bag. The clamp can be pushed back at the portion 77, force being exerted through the bag material, when the bead is being put into the groove. A plurality of clamping elements, such as 70, would be used, depending upon the particular shape of the base. Thus, for a base shown in FIG. 3 the elongated sides would require a single clamping element for each side, whereas around the curved ends a plurality of adjoining and narrow clamping elements or fingers, substantially shaped as in FIG. 4, would be used in arcuate array.

In the form of the invention shown in FIG. 5, the bead 79 comprises a continuous expansible tube which may be molded as part of the bag 80 or cemented, as shown, to the lower margin thereof. One or more ports 81 through the wall of the tube and the bag material are provided so that inflating air fills the tube as well as the bag to maintain a seal within the base groove 82, and to retain the bag to the base.

In the form of the invention shown in FIG. 6, the bead 84 is a separate tube cemented to the bag 87 wherein the pressure in the tube may be high to form any desired degree of clamping effect within the groove 88. Thus, the tube pressure is isolated from the bag pressure which may be substantially lower. In such modification, the impact force for breakaway depends, of course, on the degree of pressure in tube 84 and such pressure may be varied to suit any particular conditions. The tube may be inflated through a valve 89 accessible through a port 85 in the groove, which may be covered by a cap 86, as shown.

Figure 7:
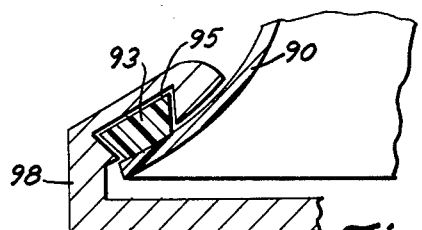

In the form of the invention shown in FIG. 7, the bag 90 has a bead 93 of generally keystone shape and of resilient material, such as rubber or plastic. Thus, although not hollow, such bead can be manually forced into a correspondingly shaped groove 95 in the base 98, as shown, and pressure within the bag will maintain the seal. However, impact will pull the bead out to permit dislodging the bag.

Figure 8:
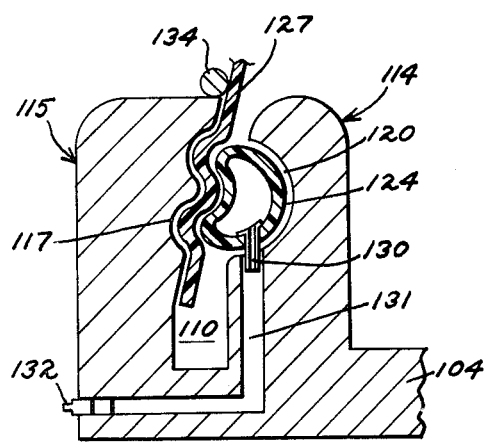

In the form of the invention shown in FIG. 8, the base 104 has an outer wall 115 and an inner wall 114 with a spacing 110 therebetween. The outer wall is convoluted at 117 and the inner wall has a groove 120 in which is a pneumatic tube 124. The plastic bag has a lower margin 127 which is gripped between the convoluted outer wall and the inflated tube. The tube may be cemented to the bag or integrally molded therewith, or a separate piece, as shown. The tube is equipped with a filler tip 130 which fits snugly into a port 131 in the base. Compressed air for the tube is supplied through a valve 132 installed in the port where it emerges from the base.

A resilient plastic or rubber bead 134 is preferably secured to the bag material above the wall in order to serve as a locating device for placing the margin of the bag properly within the spacing 110 when preparing the sign for inflation. When not inflated, it will be understood that the tube 124 can be cylindrical and of sufficiently small diameter so that the lower margin of the bag can be slid therepast without interference. Upon inflation the tube expands to the general condition shown, securely clamping the bag margin with whatever degree of clamping force is desired, depending upon inflation pressures used. Obviously, any number of convolutions may be utilized for gripping purposes and the tube need not be circular in cross section but could, in fact, be elliptical or oval so as to have its larger edge side facing the convolutions. The base shown in FIG. 8 is of substantially the same shape in plan as the base of FIG. 3, except for the double wall construction shown in cross section in FIG. 8.

Figure 9:
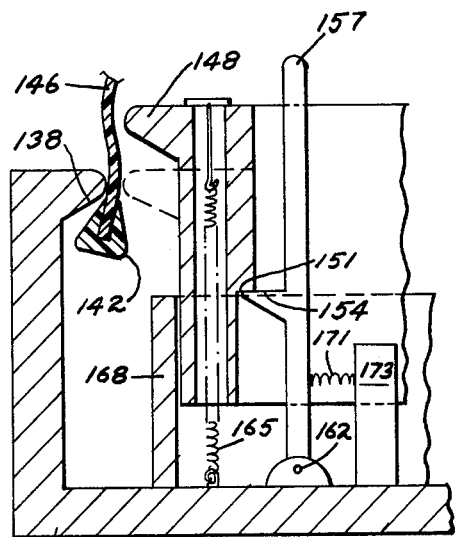

In the form of the invention shown in FIG. 9, a mechanical clamping action is used wherein the base 135 is provided with an undercut ledge 138 against which a triangular cross section resilient bead 142 is intended to abut. The bead 142 is suitably secured around the lower edge of bag 146 and is retained against the undercut ledge by an inner clamp ring 148. To facilitate insertion of the bag, before inflation, the clamp ring 148 is provided with a detent element 151 which is initially supported on a shoulder 154 of a lever 157 pivoted to the base at 162. The clamping ring is biased downwardly by a tension spring 165 and guided by a plate 168, secured to the base. A compression spring 171 acting against a cleat or stud 173 secured to the base, maintains the condition of the lever as shown wherein the clamp ring is held in raised position, the bag being applied to the base at this time. After the bead 142 has been inserted through the gap provided by the raised clamp ring, the lever 157 may be tripped by pushing it at its upper portion, force being exerted right through the bag wall. So doing releases the clamp ring which then is pulled by spring 165 to a position whereat the undercut ledge thereof, which is substantially the same as the ledge 138, is in the position shown by the dotted lines, and bead 142 is thus secured by the ledges. Inflation of the bag then follows with the bead pressing upwardly against the ledges due to such inflation. Upon impact, breakaway occurs by the bead pulling upwardly against the clamp ring and raising it sufficiently to escape through the gap thus created between the ledges. The base 135 and the clamp ring 148 have the general shape shown in FIG. 3. Only two springs 165 and two levers 157 are required, each on opposite sides of the clamp ring, but the springs and levers do not necessarily have to be in the same locations. However, more than two springs or levers may be used, if desired.

Figure 10:
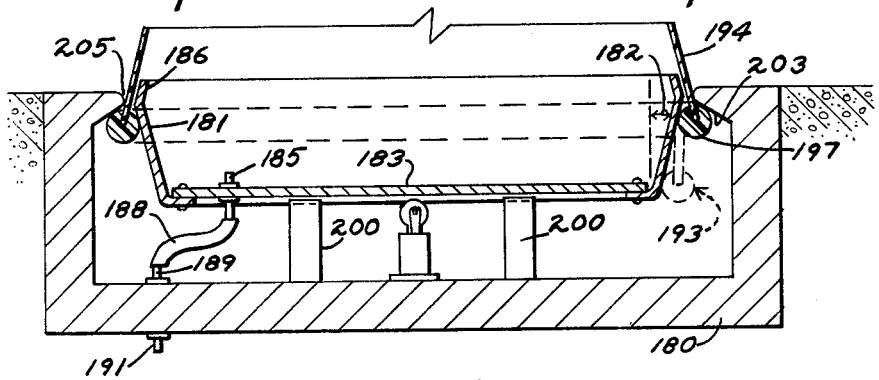

In the form of the invention shown in FIG. 10, the base 180 is provided with a pressure plate assembly consisting of a transparent rigid plastic base plate 183, sealingly attached to an inner jaw ring 181 which may be made of metal or other suitable material. The base plate 183 is fitted with an air tube 185, connected to a flexible hose 188, which is in turn connected to an air tube 189 passing through the base 180 and terminating in an air filler valve 191. The pressure plate assembly normally rests on posts 200, but can be lifted out of the base 180 for insertion of the bag 194 prior to inflation. The bag 194 has a resilient sealing bead 197 secured at its lower edge. In preparing the sign for inflation, the pressure plate assembly is removed and the lower end of the bag is slipped over the inner jaw ring 181 until the bead 197 is approximately in location 193, as shown in dotted lines in the figure. The bag and pressure plate assembly may then, together, be slipped down into the base 180 until the pressure plate 183 rests on the posts 200. To facilitate this insertion the bottom of the bag is designed to fit snugly, but not tightly around the inner jaw ring 181. Insertion is further assisted by the projection 186, on the inner jaw ring 181. Also, the flexible hose 188 is made long enough to permit the above insertion operation without the necessity for disconnection. After insertion, the bag is inflated through the valve 191. As the pressure in the bag increases, the bead 197 is drawn upward over the inner jaw ring 181 until it is wedged between the inner jaw ring and the undercut outerjaw 203 of the base 180, effecting an air seal between the bag and the pressure plate assembly. Inflation pressure simultaneously exerts an upward force on the bag and a downward force on the pressure plate. The force required to dislodge the bag is affected by the size and resilience of the bead 197, the size of the jaw gap 205, the angle 182 of the inner jaw ring 181, and the angle of the undercut 203 of the outer jaw, any or all of which may be varied to produce a desired degree of retention.

The form of the invention shown in FIG. 11 is for a ground light wherein a base 215 is set into the ground. The base is provided with a horizontal flange 218. A flexible dome-like plastic bag 222 has a peripheral margin 225 and is clamped against the flange by a clamping ring 228, which may be bolted in place with screws 224. The bag material is transparent and provided with a highly reflective inner surface 234 at one side so that rays from a sealed-reflector lamp 237 can reflect therefrom and outwardly in a general horizontal direction. Within the base a miniature pump and pressure regulator, generally designated as 240, may be utilized, having for example, an air outlet 243 and a port 246 through which intake air may feed to the pump for inflating the dome. Thus, the dome is maintained automatically inflated, in accordance with known equipment.

It will, of course, be understood that a pump and regulator equipment can also be used in any of the forms of the invention described. Maintenance of inflation pressure may also be effected by the use of compressed air distribution systems from remote pumps, or by air bottles internally or externally located, or by individual inflation by a maintenance crew. With any form of automatic inflation, a regulator is required in each unit to maintain proper pressure.

The inflated light, as shown in FIG. 11, is designed to withstand roll over by landing or taxiing aircraft. The rolling tire of an aircraft compresses the plastic dome 222 until it is flush with the level of the ground 227. The volume of the enclosure below ground is sufficiently large compared with the volume in the bag above ground that the increase in pressure when the bag is compressed flat does not cause bursting. When the roll over is complete, the bag resumes its normal position, as shown in the figure. To insure adequate resistance to damage in roll over, the base of the dome is broad relative to its height and is preferably rounded. However, in order to minimize the effect of having the aircraft wheel drop into a hole in the ground, the base 215 is furnished with a strong supporting structure 231, at or near ground level, which may be in the form of a grid or ribs with openings designed to permit the necessary passage of light into the dome and to permit the free passage of air from the dome into the base during roll over.

In the form of the invention shown in a plan view in FIG. 12, bi-directional light beams are provided. The transparent plastic dome 250 has two areas 253 and 254 of its inner surface coated with highly reflective layers. Beneath each area are light projectors (not shown) which may be similar to that shown in FIG. 11. One beam emerges from the dome after reflection from layer 254 in the direction 256. The second beam emerges, after reflection from layer 253 in the direction 225.

Another form of a bi-directional light is shown in FIG. 13, which is similar to the form shown in FIG. 12, except that the oppositely reflected beams are displaced vertically from each other instead of horizontally. In this figure, the light beams are formed by lamps 266 and lenses 267, and emerge from the bag, oppositely directed after reflection from layers 260.

FIG. 14 shows another type of bi-directional reflective ground light having the transparent plastic dome 270 to which is secured a pair of angularly related mirrors 273, cemented to a light-weight triangular block or shell 276 which may be of foam plastic, and which is cemented to the bag at its upper surface by supporting straps 274. A sealed reflector type of lamp 280 is mounted in base 283 and the rays therefrom reflect from mirrors 273 in opposite directions as indicated. It will, of course, be appreciated that the vertical dimensions of block 276 and light 280 should be such that in the event of roll over of the device by an aircraft wheel, the block 276 will have sufficient space within the base so that as the bag is compressed downwardly thereinto by the wheel, no damage to the block will occur nor to the light 280.

In the form of the invention shown in FIG. 15, the size of the hole in the upper plate of the base necessary for the passage of the light from the lower chamber into the bag is reduced to a minimum by the use of special optical components. In the figure, an ellipsoidal reflector 290 is shown with a light source 295 placed at its near focal point. The light rays reflected from the reflector 290 converge at its conjugate focus, in the plane of the upper support plate 291 of the lower chamber of the light, where only a small aperture 293 is required to pass the light into the upper chamber. In the upper chamber, the light is redirected near the horizontal by a highly reflecting layer 296, applied to the inside of the transparent bag 298.

It is understood that other optical arrangements may be used to accomplish the same or similar purposes: To concentrate the light as it passes through the upper support plate from the lower to the upper chamber so that the required aperture in the plate can be very small in at least one dimension; and thus permit undisturbed passage of a rolling aircraft wheel over the light.

When the light aperture cannot be reduced sufficiently, smooth roll over may be facilitated by the use of ribs or grids across the light transmitting aperture, although this will result in a reduction of light efficiency.

FIGURE 16 shows an arrangement whereby one or a series of ground lights may be deflated so as to be substantially flush with the upper edge of the base, or sucked into the base, so that tractors or snow plows, or the like, may be run directly over the base without injuring the bag material. Although such an arrangement may take many forms, the form illustrated shows a series of ground light bases 300 having a common vacuum conduit 305 and a common pressure conduit 308. The conduits lead to a compressor wherein the intake is connected to the vacuum conduit and the pressure side is connected to the high pressure conduit. Each base taps off from the conduits via a multiway solenoid operated valve 312 so that the base can be connected to either conduit for selectively inflating or deflating respective bags. Obviously, the solenoid operated valves may be individually controllable or they may be all on a common circuit so as to be simultaneously controllable. FIG. 16 illustrates individual control by way of respective switches 316 and dotted electric line connections. For common control a single switch would be used and all solenoids would be connected in parallel in a very well known manner.

FIG. 17 illustrates a modification wherein the inflated bag is shaped so as to have a readily bendable lower portion, yieldable to impact or unusual wind stresses. Thus, base 320 has disposed thereon the inflatable bag 324 which has a flange 328 clamped by ring 332 bolted to the base, as shown, whereby the bag is securely held to the base. The upper portion of the bag 324 is of generally wedge or tringular shape and it terminates in a lower portion having the contricted neck 335 such that the bag can bend at the neck to the phantom line position shown, in the event of impact or very heavy winds, etc. Thus, the bag structure, while not deflatable upon impact, is readily yieldable to predetermine side stress in either direction which, not only protects aircraft in event of collision with the bag, but also serves to protect the bag.

Having thus described our invention, it is apparent that various changes may be made without departing from the spirit thereof and, therefore, we do not seek to be limited to the precise illustrations herein given, except as set forth in the appended claims.

We claim:

1. In a device of the class described, the combination of a base element and an open bottom inflatable sign element made primarily of flexible material secured to said base wherein said elements effect a substantially airtight chamber, means for inflating said chamber and means for effecting said securement releasably upon impact against said flexible sign element, said means comprising a bead extending around one such element and a groove extending around the other such element, said bead being disposed in said groove and means for retaining said bead therein by a predetermined force whereby said sign is rapidly deflated by pulling of said bead out of said groove upon said impact.

2. In a device as set forth in claim 1, wherein said latter means comprises affixation of said bead to said flexible sign element to effect to a gripping force of said bead acting against said groove when said chamber is inflated.

3. In a device as set forth in claim 2, said bead being of resilient solid material.

4. In a device as set forth in claim 1, said retaining means comprising a hollow interior in said bead and means for conducting pressure into said hollow interior.

5. In a device as set forth in claim 1, said retaining means comprising a hollow interior in said bead and means for conducting pressure into said hollow interior, said latter means comprising a device for inflating said bead at a pressure different from the pressure in said chamber.

6. In a device as set forth in claim 1, said retaining means comprising a hollow interior in said bead and means for conducting pressure into said hollow interior, said latter means comprising a passage between said chamber and the hollow interior of said bead.

7. In a device as set forth in claim 1, wherein said bead is hollow, and said latter means comprising a device for introducing pressure into said bead for inflation thereof against said inflatable sign element on one side of a wall thereof and means comprising a convoluted surface on the other side of said wall, against which said wall is pressed by inflation of said bead.

8. In a device as set forth in claim 1, said latter means comprising spring biased elements disposed to press against said inflatable sign element.

9. In a device of the class described, a base element having an open top and a substantially hollow interior, an inflatable element having a margin secured to said base about the interior periphery thereof, and means for effecting an impact breakaway attachment between said elements comprising a peripheral bead on one of said elements and a groove accommodating said bead in the other of said elements, said elements having corresponding straight sides and corresponding curved ends.

10. In a device of the class described, a base element having an open top and a substantially hollow interior, an inflatable element having a margin secured to said base element about the interior periphery thereof, and means for effecting an impact breakaway attachment between said elements comprising a peripheral bead on one of said elements and a groove accommodating said bead in the other of said elements, and a light source within said base element, said inflatable element being at least partially translucent.

11. In a device as set forth in claim 10, including graphic characters on said inflatable element disposed to be delineated by light from said light source.

12. In a device of the class described, a base having an open top and a substantially hollow interior, an inflatable sign element having translucent areas, attachment means for effecting an impact breakaway attachment between said base and said sign element, an illuminating means within the confines of said base and protected thereby, said element having a bottom open to the interior of said base, and means for inflating said sign element wherein said base forms a bottom closure therefor, said attachment means effecting an airtight seal between said base and said sign element.

13. An inflatable sign comprising a base, a flexible inflatable element, means for securing said flexible element to said base with a predetermined gripping force whereby said element may be released from said base by predetermined impact force, means for inflating said flexible element, and means for securement of said base so as to permit breaking away of said flexible element therefrom upon being struck with a predetermined impact force, wherein said flexible element has an open bottom and forms an airtight chamber with said base wherein breaking away of said flexible element from said base deflates said chamber.

References Cited by the Examiner

UNITED STATES PATENTS

| | | | |
|---|---|---|---|
| 2,332,362 | 10/1943 | Bartow | 240—1.2 |
| 2,561,016 | 7/1951 | Ford | 40—125 X |
| 2,593,188 | 4/1952 | Rikelman | 46—90 X |
| 2,762,327 | 9/1956 | Weig | 40—125 X |
| 2,800,099 | 7/1957 | Baker | 40—125 X |
| 2,808,803 | 10/1957 | Weig | 40—125 X |
| 2,977,973 | 4/1961 | Chakine | 46—90 X |

EUGENE R. CAPOZIO, *Primary Examiner.*

JEROME SCHNALL, *Examiner.*